Feb. 10, 1970   R. L. FLATRAY   3,494,360
SUCTION DEVICE FOR DENTAL AND SURGICAL EVACUATIVE PURPOSES
Filed Dec. 19, 1966   7 Sheets-Sheet 2

INVENTOR.
RAYMOND L. FLATRAY
ATTORNEY

Feb. 10, 1970        R. L. FLATRAY        3,494,360
SUCTION DEVICE FOR DENTAL AND SURGICAL EVACUATIVE PURPOSES
Filed Dec. 19, 1966        7 Sheets-Sheet 3

FIG. 4

INVENTOR.
RAYMOND L. FLATRAY
BY
ATTORNEY

FIG. 5

INVENTOR.
RAYMOND L. FLATRAY
BY
ATTORNEY

United States Patent Office
3,494,360
Patented Feb. 10, 1970

3,494,360
SUCTION DEVICE FOR DENTAL AND
SURGICAL EVACUATIVE PURPOSES
Raymond Leonard Flatray, 2480 S. Osceola,
Denver, Colo. 80219
Continuation-in-part of application Ser. No. 412,554,
Nov. 19, 1964. This application Dec. 19, 1966, Ser.
No. 609,980
Int. Cl. A61m 1/00
U.S. Cl. 128—277                           20 Claims

ABSTRACT OF THE DISCLOSURE

This invention relates to a fluid operated suction device having a housing with supply means, waste intake means, and waste discharge means. Within the housing and connected to the supply is a vacuum producing means responsive to fluid pressure. An evacuating means is connected to the waste intake for supplying waste to the discharge in response to a vacuum within the housing.

---

This application is a continuation-in-part of U.S. application S.N. 412,554, filed Nov. 19, 1964.

This invention relates to an apparatus capable of providing sufficient suction to be of use in the dental practice for evacuation of the oral cavity during operative procedures, or for use in general surgery to maintain a clean operating field.

With the advent of the water injection attachments available to high speed drilling equipment now commonly in use by dental practioners which water injection operates as a coolant on the tooth being worked upon, there has long been a need for a simple, non-electrical, suction device to orally evacuate the volume of water injected into the oral cavity as well as removing by suction foreign debris from the tooth particles. The device is also much in demand during all dental surgical operations for the purpose of removing bone bits, tissues, blood and saliva from the oral cavity during the operative procedure. The device which I have invented may also be used in other medical surgical technics and would not therefore be limited to the dental field alone, however, for purposes of illustration and explanation I have chosen to amplify upon the use of the apparatus involved as related to the dental field.

The primary purpose of this invention is to provide a suction device which is considerably smaller than available devices on the market today, and as such, one which may be readily and simply installed in most locations which would require the use of such an apparatus.

The further object of this invention is to provide a suction device which does not require electricity as a means of power, allowing the use of this device in explosive atmospheres, such as hospital operating rooms, thereby eliminating the possibility of electric shock to either the operator or the patient.

Still a further object of this invention is to provide a suction device which does not employ the use of moving parts, fans, pistons, or other customary vacuum forming methods, thus eliminating the need for maintenance and providing a device which is virtually free of failure.

A still further object of this invention is to provide a suction device which will drain continuously and not require stopping of the power unit while the accumulated evacuated fluids and other materials are drained from the apparatus.

A still further object of this invention is to provide a suction device which may be controlled by any one of the following types of controls; a hand control, controlled by the patient; a foot control, controlled by the doctor; or a hose control located at the end of the suction hose held by an independent operator; or a combination of the above types of controls, making a versatile arrangement.

Yet, it is another object of this invention to provide a suction device having a housing comprising a plurality of sections disposed in a stacked relationship to each other.

It is a further object of this invention to provide a suction device having a primary source of evacuation and which is adaptable to accommodate at least one other auxiliary source of evacuation by utilizing an independent vacuum producing housing section.

It is another object of the present invention to provide a suction device which may readily be adapted to accommodate a plurality of vacuum producing housing sections.

Another object of this invention is to provide a device having a plurality of evacuating sources, each of which may be independently activated by simple, and effective control means.

It is another object of this invention to provide a suction device having a plurality of evacuating sources and which can operate from a single supply of fluid pressure.

It is another object of this invention to provide a suction device which would be permanently installed in one location.

It is a further object of this invention to provide power from a portable tank containing compressed air, nitrogen, or other inert non-toxic gas, and to provide a suitable receptacle for collecting waste material, whereby this apparatus may be made entirely portable and independent of any other source of power and by virtue of the mounting bracket and air connection this device may be moved from one location to another and attached by a quick connector since most dental offices, if not all, have compressed air available as a part of their normal operating equipment.

Another object of this invention is to provide a compact and efficient control 5.

The apparatus which I have designed would utilize this same source of power in the operation of the apparatus.

SUMMARY

This invention relates to a suction device which is lightweight, compact, and easily transportable, and has a primary use in the field of oral cavity evacuation. The device comprises a housing consisting of a plurality of stacked engageable sections which can be easily disassembled for cleaning and maintenance purposes. Suitable control valves connect a fluid pressure to the top cap section which in turn is connected to a venturi jet which extends into the housing. A waste evacuating tube is connected to the housing at a point above the exit orifice of the venturi jet. Associated with the evacuating means is a hand control valve which operatively supplies fluid pressure to the venturi jet for producing a vacuum in the area of the exit orifice. In response to a vacuum created by the venturi jet waste or foreign debris is drawn through the evacuating means and deposited in the collection section of the housing. The housing is adaptable to receive other vacuum producing sections located intermediate to the top cap portion and the collection section. These intermediate sections have an independent vacuum producing venturi jet and evacuating hose means for also supplying waste or foreign debris to the collection bowl in response to fluid pressure.

Further objects and features of the invention will become apparent from the following detailed description of the application of the apparatus and of a particular preferred form of apparatus illustrated in the accompanying drawings.

FIGURES 1–5

Figure 1:
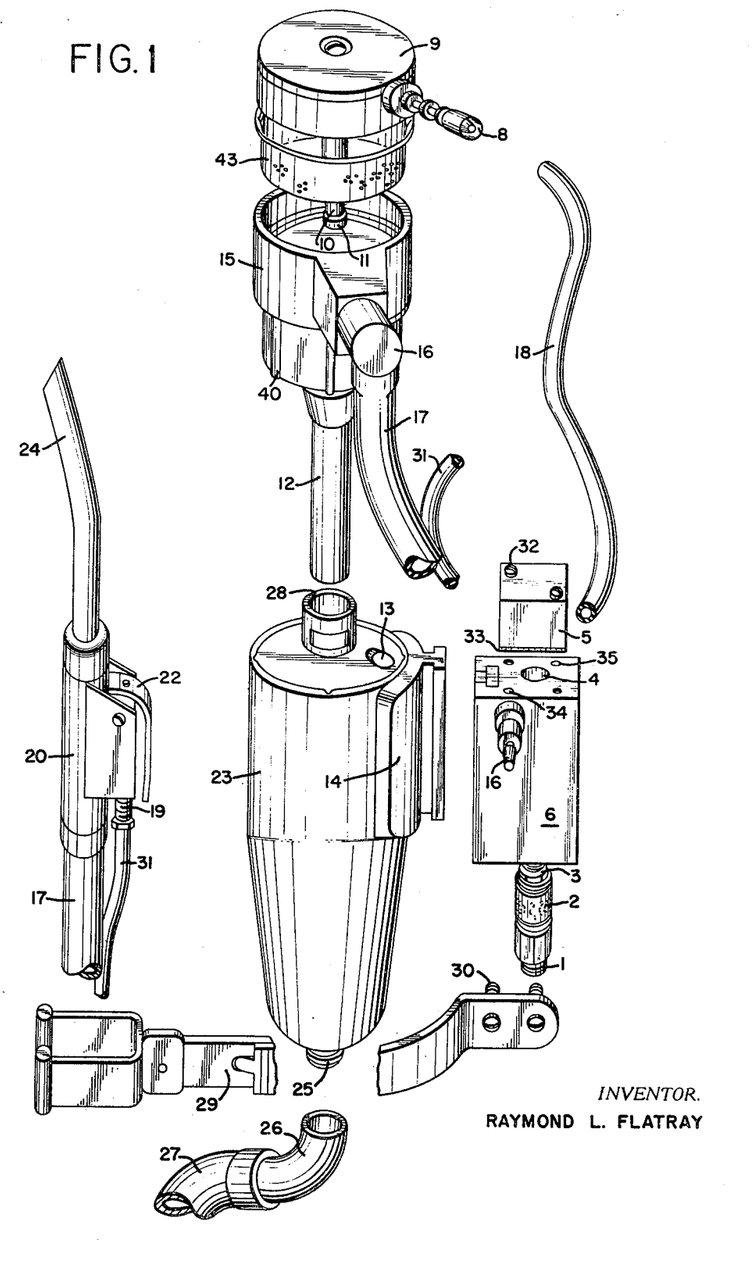
FIGURE 1 represents an exploded three-dimensional view illustrating components of the apparatus in their relative mounted positions.

In FIGURE 1, the operative power being gas supplied for example by a compressor, such gas enters the device by means of the source tubing 1 having a quick air coupler 2, which acts as a shut-off when disconnected allowing for the removal of the vacuum device for cleaning. From the quick air coupler 2, the air passes through the slide block 6, which has an appropriate coupling 3 for mating with the quick air coupler 2.

Glancing at FIGURE 3 of the drawings, there is a cut-away section of the slide block 6 indicating a passage tube 4, which extends to and cooperates with the specially designed control valve 5, which control valve 5 is shown in assembled position in FIGURE 3 and more in detail as will be described hereinafter in FIGURES 1 and 4 respectively.

Figure 3:
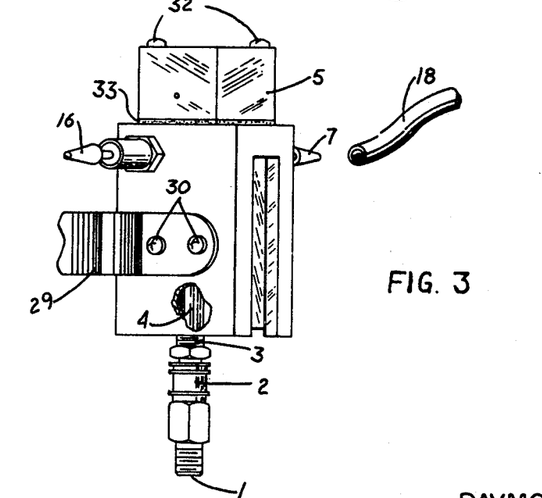
FIGURE 3 is an assembly drawing of a slide block showing a mounting bracket and hose connection as well as the control valve unit for use in connection with the apparatus.

Generally, the air passing through the control valve 5 into the slide block 6 through the fitting 7 as shown in FIGURE 3, through tube 18, entering the hose fitting 8 which is attached to the cap 9. Also attached to the cap 9 is the jet 10 having an orifice 11 of approximately .055 inch in diameter, which directs the jet of high velocity gas into the venturi housing 12.

Upon emerging from the lower end of the venturi 12, the gas is exhausted through two holes 13 near the top of the collection bowl 23 and discharged downward from the muffler 14 into the atmosphere.

The action of a high velocity jet of gas through the venturi 12 creates a vacuum in the upper chamber of the suction bowl 15. You will note from FIGURE 5 that there are baffles 40, which are around the peripheral base of the suction bowl 15 which fit into the slotted grooves on the top of the collection bowl 23 creating a space which further acts as a muffling provision when the apparatus is in operation. An elbow 16 is attached to the suction bowl 15, which in turn connects to the suction hose 17. Since the suction hose 17 opens directly into the suction bowl 15, above the venturi 12, it is also under vacuum, causing a continuous flow of air and liquid or solids to be evaporated through the mouthpiece 24, the suction hose 17, down through the venturi 12 to the end of the diffuser 28 and into the collection bowl 23.

Figure 5:
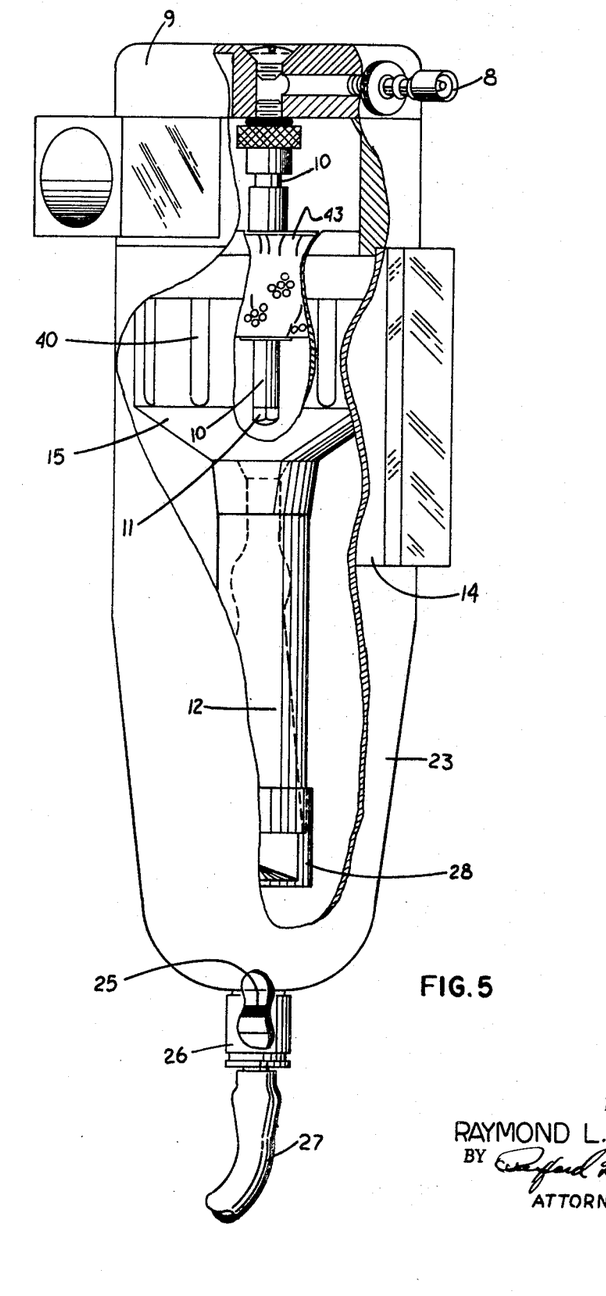
FIGURE 5 is an assembly drawing of the main housing unit, partly in section to indicate the various components in detail, in their relative assembled positions.

The air is then separated from the liquid and solids, and is exhausted in the same manner as the jet of gas which operates the venturi. The liquid and solid materials are discharged through an opening 25 into the drain fitting 26 and drain hose 27.

A separator or strainer 43 is provided to separate solid particles from the matter being drawn through the apparatus, this allows recovery of precious metals or articles accidentally drawn into the suction apparatus. It is essential that this strainer 43 have an open area, to allow passage of air and liquids of at least one times the area of the hose inlet into the suction bowl 15 and desirable that this area be two to three times the inlet area. This strainer 43 is made from a material such as cadmium having holes of ½₂ inch in diameter or 400 holes per square inch. In the apparatus that I have shown, this may be varied in the proportions that I have suggested. It is also important to note that the strainer 43 is not an essential element to the operation of the suction apparatus as such.

At the lower end of the venturi 12, the diffuser 28 is provided for attachment to the exhaust end of the venturi 12 to direct the discharge away from discharging directly down the drain 25. This minimizes the amount of air discharged into the drain plumbing.

Figure 2:
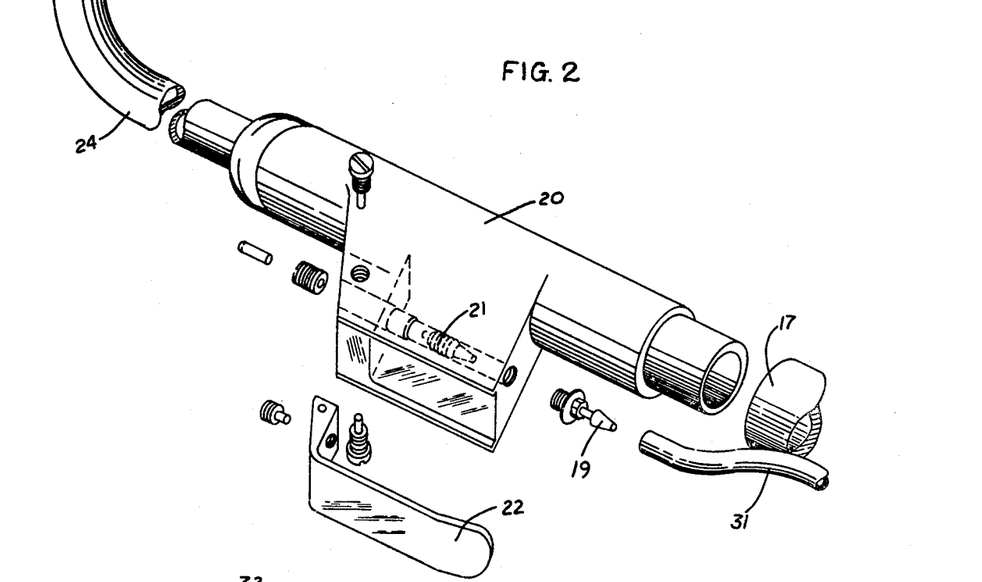
FIGURE 2 is an exploded three-dimensional view illustrating one form of a hand control with a nozzle on the end of the evacuating tube having the control located adjacent thereto.

In the device that I have shown, it is anticipated that the suction device will drain into an open drain such as the dental unit cuspidor. If the device is drained into permanent plumbing, an exhaust pressure breaker should be used. If that were the case, the pressure breaker which I have not shown would be connected to the bottom of the collector bowl 23. The drain hose attachment would then be made to the lower end of the exhaust pressure breaker and all air exiting from the drain at the bottom of the collector bowl would be dispelled by such a pressure breaker assuring that no air would enter into the plumbing system. Having thus described generally the principle of operation and again looking at FIGURE 1, you will note that there is a hose fitting 16 shown on the slide block 6. When the gas leaves the slide block 6, it also emerges through the hose fitting 16 into a small tube 31 molded alongside the suction tube 17 for convenience of carrying, the other end of tube 31 connecting to the spring loaded ferrel 19 as shown in FIGURE 2 of the drawings, carrying air into the mouthpiece of the valve 20. This mouthpiece valve 21 is similar to a small tire valve of a commercial kind. When the mouthpiece valve lever 22, which is attached in a position shown in FIGURE 1, is depressed, the valve 21 is actuated, actuating the special valve assembly 5 creating a suction in the mouthpiece nozzle 24. When the valve lever 22 is not depressed, the valve 21 is of course closed re-activating special designed valve 5, preventing the air from passing through the control valve 5 back through the slide block 6 and out through the tube 18 connected at the connector 7.

As shown in FIGURES 1 and 3, respectively, there is a mounting bracket 29 which is attached to the slide block by means of two screws 30, having on one end a holder for hanging the mouthpiece valve nozzle. This may be mounted to either side of the apparatus by merely removing the two screws from one side of the slide block 7 and mounting it on the reverse side, allowing the apparatus to be installed either in a right hand or left hand position.

You will note that the muffler 14 molded on the outside of the collection bowl 23 has a T-shaped section to facilitate positioning the collector bowl 23 and apparatus onto the T-slot provided in the slide block 6, thus mounting the entire device onto the slide block 6, which is in turn fastened to the mounting bracket 29. Looking at FIGURE 3, you will also note that both sides of the slide block 6 have been provided with T-slot construction so that more apparatus may be added on the same mounting device by merely utilizing the unused T-slot connections in slide block 6.

During normal operation, the suction device requires an input of approximately 2.1 cubic feet per minute of air or gas through the jet 10, at approximately 70 p.s.i. line pressure; the resulting suction of approximately 5–6.5 cubic feet per minute may be achieved by having a mercury lift of approximately 2–3 inches. The air velocity through the mouthpiece 24 in the apparatus that I have shown, with a suction of approximately 6.2 cubic feet per minute, is calculated to be 81.17 miles per hour.

Figure 4:
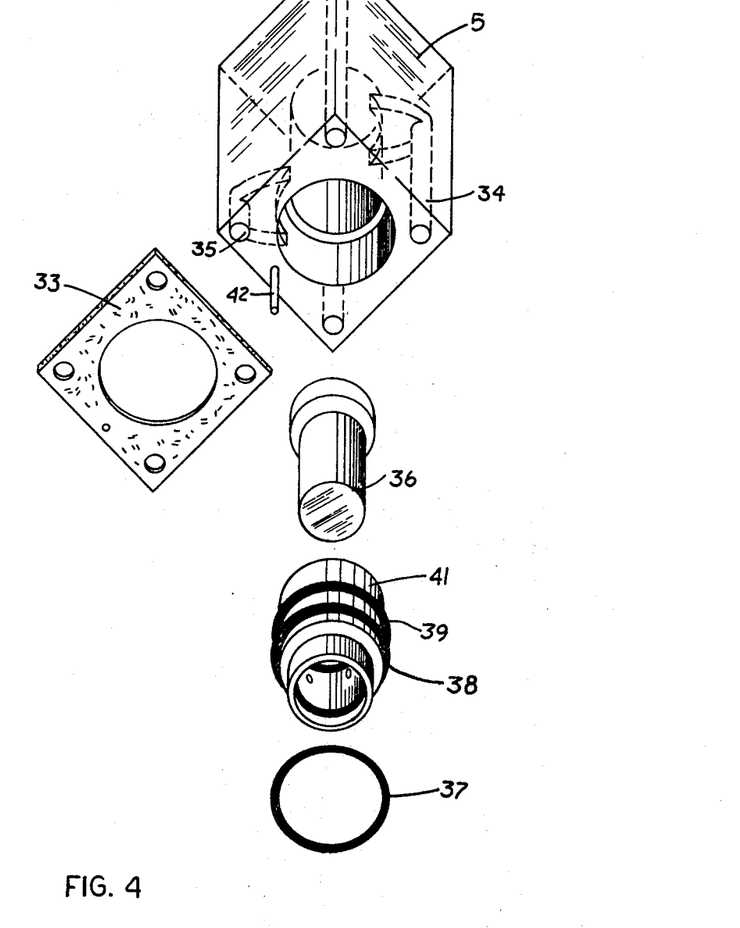
FIGURE 4 is an exploded three-dimensional view of the control valve assembly showing the various component parts of the valve.

Turning now to FIGURE 4, there is shown an exploded three dimensional view of the special control valve 5, which is mounted on the top of the slide block 6 in the position as indicated in FIGURE 3. You will note that the slide block has four small symmetrical holes positioned around the entrance hole 4. Two of these symmetrical holes are to receive positioning screws 32. A gasket 33 is inserted between the control valve 5 and the slide block 6 to make the connection air-tight. The other two holes 34 and 35 serve as air chambers for cooperating with the fitting 16 and 7, respectively, during the operation of the apparatus. Hence, when the mouthpiece valve lever 22 is actuated and the valve 21 is therefore actuated, allowing the escape of gas pressure from tube 31 and from hole 34, gas pressure from entrance pipe 4 actuates valve 5, piston 36, allowing the passage of gas through hole 35, fitting 7, through tube 18, and into the jet 10, through the venturi 12, to functionally operate the apparatus as hereinbefore explained. You will note in FIGURE 4 that a guide pin 42 has been used for the purpose of positioning the valve 5 onto the slide block and a gasket 33 placed between the valve 5 and the slide block 6 to make the connection air-tight. For further air-tight assurance, rubber O rings 37 and 38 and 39 have been placed around the piston receiver 41.

It is immaterial whether the suction hose 17 is brought directly into the venturi throat rather than into the suction chamber as I have shown in the particular application of my invention. It would also be possible to install the venturi directly into a waste pipe, eliminating the collector bowl, and the mounting, hardware and most of the part presently used, however, it would be limited as to versatility.

You will note particularly in the apparatus that I have designed that it does not supply any water to the oral cavity. Nor does it require the operator to be concerned about foreign debris clogging up the source of power, since the discharge is direct to an open drain, such as a dental unit cuspidor. Valuable fillings may necessitate the use of a cadmium type strainer that I have shown, although as explained this may be eliminated and still have the apparatus function.

OPERATION OF DEVICE IN FIGURES 1–5

When the valve lever 22, shown in FIGURE 1, is depressed the valve 21 opens to release pressure which had been acting on the head of piston or plunger 36. Thus, the trapped fluid pressure escapes from the tube 31 to the atmosphere. With the pressure relieved from the top of the plunger or piston 36 fluid pressure entering from the pipe 4 acts against the bottom of the plunger 36. Fluid pressure is thus allowed to pass through the holes in piston receiver 41 and the passage 35, the fitting 7, and into the top cap portion 9 through the fitting 8. Fluid pressure then passes through the venturi tube 10 creating a vacuum in the collection bowl 15 surrounding the exit orifice 11. Waste or foreign debris is thus evacuated through the mouthpiece nozzle 24, the tube 17, and into the collection bowl chamber 15 at the fitting 16. Solid waste particles are collected in the strainer 43, while waste fluids are discharged at the line 27 after passing through the diffuser 28. The fluid pressure vapor discharged from the orifice 11 passes down through the venturi 12 and is exhausted to the atmosphere through the hole 13 and the slotted ports (not shown) of the muffler 14.

FIGURES 6–13

Figures 6, 7, 12, 13:
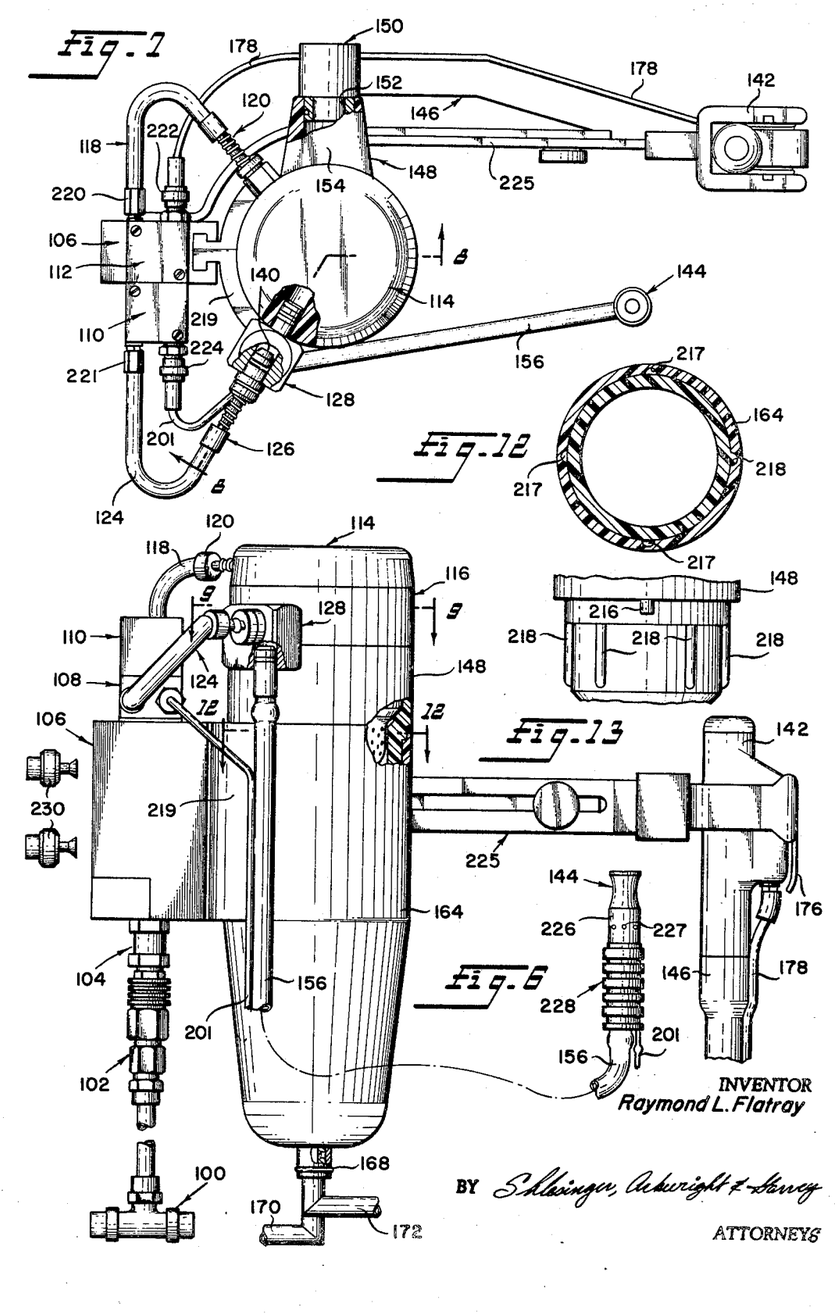
FIGURE 6 represents a side-elevational view of the device illustrating components of the apparatus in their relative mounted positions and having a section partially cut away.
FIGURE 7 is a top view of FIGURE 6 having portions broken away for purposes of illustration.
FIGURE 12 is a detailed cross-sectional view of the housing blocking arrangement of FIGURE 6 substantially taken along lines 12—12 and viewed in the direction of the arrows.
FIGURE 13 is a partial view of the collection bowl removed from the housing of FIGURE 6, illustrating the locking tab.

As shown in FIGURE 6 fluid pressure or a source of fluid power is supplied to the device through a coupling 100, a quick fluid coupler 102, and a fitting 104. The quick air coupler allows the fluid source of pressure to be readily disconnected from the fitting 104. The fluid pressure then passes through passage (not shown) in a housing block 106, a manifold block 108, and a plurality of control valves 110 and 112. The control valve 112 allows fluid pressure to be delivered to a cap portion 114 of the housing, while the valve 110 passes fluid pressure to an auxiliary evacuation housing section 116. Fluid pressure to the top cap section 114 passes through a tube 118, fitting 120, and passage 122 shown in FIGURE 8. Fluid pressure to the auxiliary evacuation section 116 enters through a tube 124, a fitting 126, a venturi assembly 128, and finally passage 130 more clearly shown in FIGURES 8 and 9. The fittings are readily removable, thus facilitating disassembling and cleaning operations.

Figure 8:
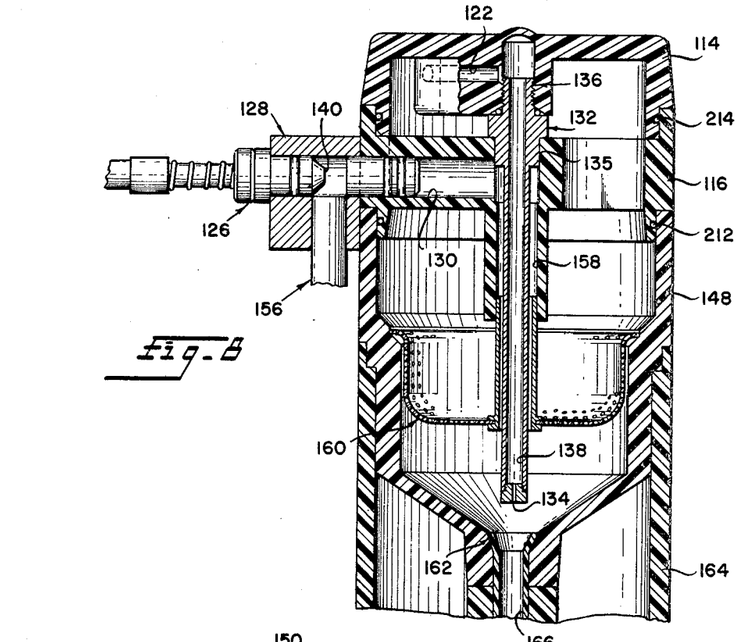
FIGURE 8 is a partial cross-sectional view of FIGURE 7 taken along lines 8—8 and viewed in the direction of the arrows.
Figure 9:
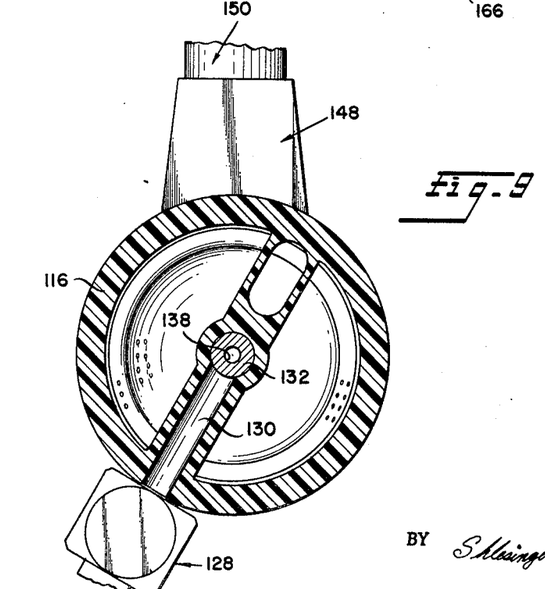
FIGURE 9 is a cross-sectional view of FIGURE 6 taken substantially along lines 9—9 and viewed in the direction of the arrows.

As more clearly shown in FIGURE 8, fluid pressure entering the top cap portion 114 through the passage 122 passes down through a venturi tube assembly 132 and exits as a venturi orifice 134. The venturi assembly 132 is secured by slidable engagement with a circular opening 135 formed in the central portion of the auxiliary evacuation section 116. Further the venturi assembly 132 has a threaded top portion 136 for engagement with a threaded portion in the top cap section 114. It can be seen that the passage 122 directly connects with a hollow portion 138 of the venturi assembly 132. Therefore, when fluid pressure is supplied to the top cap portion 114 a vacuum is created in the area surrounding the venturi opening 134.

On the other hand, fluid pressure entering the venturi assembly 128 creates a vacuum independently of the vecuum created at the venturi orifice 134. This vacuum is created in the area surrounding a venturi jet orifice in a head 140 of the venturi assembly 128.

These two independent sources of vacuum produce a suction which enable a plurality of evacuating devices to be operated either individually or simultaneously. Referring again to FIGURE 6 the vacuum produced at venturi orifice 134 is effective to remove foreign debris or waste from an oral cavity through the evacuation assembly 142, while the vacuum produced at the venturi head 140 is effective to remove waste from oral cavities through the evacuation assembly 144.

A tube 146 in the evacuating assembly 142 connects to a collection bowl section 148 of the housing. The hose or tube 146 discharges into the collection bowl section 148 through a molded fitting 150, and a passage 152 formed in a protruding portion 154 of the collection bowl section 148 as shown in FIGURE 7.

Similarly, the evacuation assembly 144 discharges waste or foreign debris into the collection bowl 148 through a hose 156. Waste discharged by the hose 156 enters the passage 130 and falls into the collection chamber through an annular opening 158 which surrounds the tubular portion of the venturi assembly 132, clearly illustrated in FIGURE 8.

Now referring to FIGURE 8, it can be seen that any waste material removed by the evacuation assemblies 142 and 144 is deposited in the collection bowl section 148. Heavy waste particles discharge from the evacuation assembly 142 is first screened by a filter 160, and then passes to a throat 162 in the collection section 148, while the discharge from the evacuation assembly 144 is directly discharged into throat 162.

Waste material deposited at the throat 162 is then collected in a discharge section 164 of the housing after passage through an opening 166. As shown in FIGURE 6, the waste may be directly discharged from the bottom of the discharge housing 164 through a fitting 168 and into an open reservoir designated by a connection 170. On the other hand, if the waste were to be discharged into a closed system a line 172 may be connected to an air circuit breaker (not shown) in order to exhaust fluid pressure vapor that may have combined with the waste material. However, as shown in FIGURES 1 and 5, the fluid pressure vapor is separated from the waste by the diffuser 28, and exhausted through holes 13, and ducted ports (not shown) in the muffler 14.

Figures 10, 11:
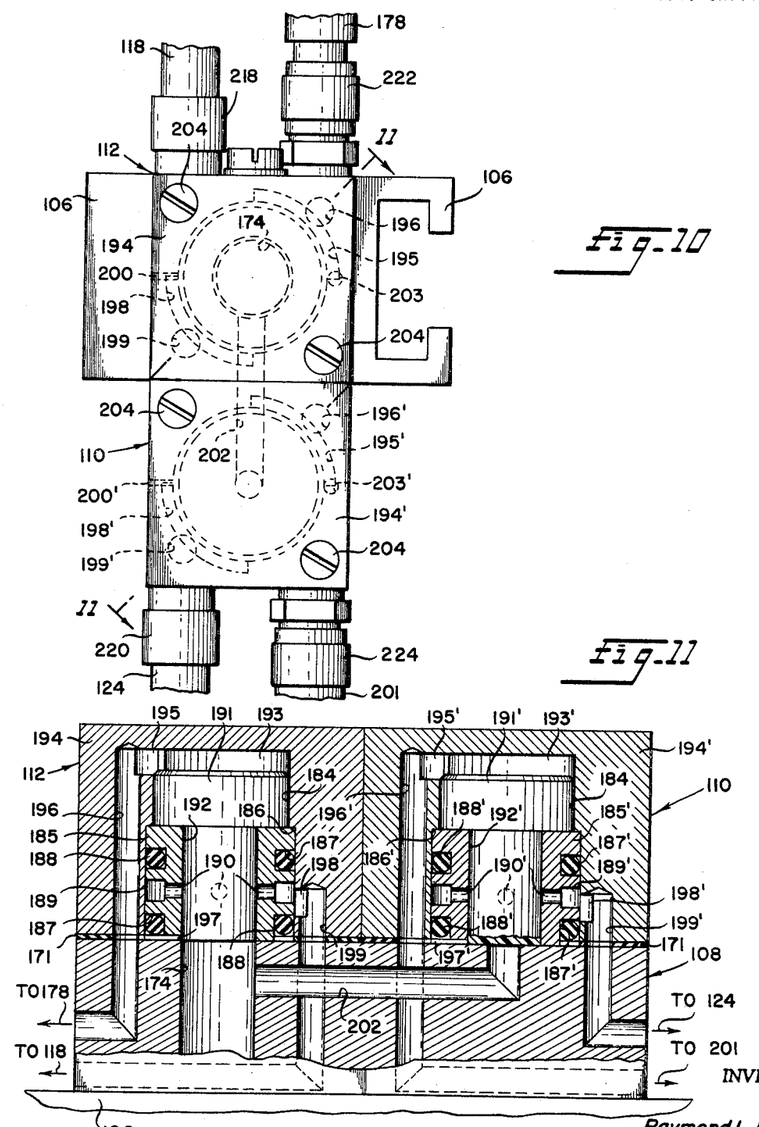
FIGURE 10 is a detailed top view of the valve or control assembly of FIGURE 7.
FIGURE 11 is a cross-sectional view of the valve or control means taken substantially along lines 11—11 of FIGURE 10 and viewed in the direction of the arrows.

With reference to FIGURES 10 and 11 taken in conjunction with FIGURE 6, it can be seen that the manifold 108 and the valves 110 and 112, having interposed therebetween a pair of sealing gaskets 171, are operative to control the flow of fluid pressure to the vacuum producing venturis 132 and 128. The valves 110 are identical in structure and operate in a similar manner. The components of the valves will be described primarily with reference to the valve 112 and its relationship to the manifold block 108. The fluid pressure passing through support block 106 enters the manifold block 108 through an opening 174 to provide a source of fluid pressure to both the valves 110 and 112.

Passage of fluid pressure through the valve 112 is controlled by a hand lever 176 and a tube 178. With the hand lever 176 in a depressed position the valve 21 (FIGURE 2) allows the tube 178 to bleed fluid pressure to the atmosphere, hereinafter more fully described.

Specifically, as shown in FIGURE 10 the thimble type valve 112 has an inner graduated bore 184 which receives a plunger housing 185 which abuts at a shoulder 186. The plunger housing 185 has a plurality of circumferential or peripheral grooves 187 having O rings 188 disposed therein for insuring an air-tight seat. Intermediate to the peripheral groove 187 is an annular groove 189 which communicates with a plurality of ports or holes 190. A piston or plunger member 191 slidably engages a circular bore 192 in the piston housing 185. It is to be noted that the plunger 191 is manufactured of a lightweight synthetic material having a top head portion of greater diameter than the bottom head portion. When the plunger or piston 191 is seated against the plunger housing 185 a space 195 is formed above the uppermost head portion.

In the solid block portion of the valve 112 and designated as 194 are formed two passages which communicate with the upper space or cavity 193 at an arcuate recess 195 cut in the valve housing 194. One connection to the recess 195 is made through a passage 196 which extends through the manifold block 108 and the valve 112. Input fluid pressure entering passage 174 also connects with the passage 196 through a small bore 197. The passage 196 exists through the manifold 108 and connects with the tube 178. Aligned with the plurality of ports 190 is an arcuate slot 198 in the valve housing block 194. The arcuate slot is connected through a passage 199 which extends down through the valve block 194 and exits at the manifold 108 to connect with the hose 118. A bleed hole 200 is formed in the valve housing block 194 to discharge pressure when the piston or plunger 191 is descending towards a seated position.

The valve 110 is of identical construction and operates in a similar manner. Accordingly like prime numbers have been used to indicate like parts. However, in this instance the passage 196′ which exits at the manifold 108 is connected to a hose 201 which is part of the evacuation assembly 144. The passage 199′ exiting from the manifold block 108 is connected to the hose 124 for feeding fluid pressure to the venturi assembly 128. Thus, it can be seen that the hose connections 118 and 124 supply fluid pressure to the top cap section 114 and the auxiliary evacuation section 116 respectively. The hose connections 178 and 201 are utilized to control the operation of the valves 112 and 110. Further, it can be seen that the single source of fluid pressure entering the passage 174 is effective to supply the valve 112 and also the valve 110 through a parallel passage 202. The adjacently mounted valves 110 and 112 are positioned on the manifold block 108 by a plurality of pins 203 and secured thereto by a plurality of screws 204.

Now referring to FIGURE 8, the plurality of stacked sections 114, 116, 148, and 164 are interlocked to form the suction device housing. The top cap portion 114 is secured to the auxiliary evacuation section 116 at the threaded portion 136 formed by a threaded bore in the top cap portion 114 and a male thread on the venturi assembly 132. The auxiliary evacuation section 116 interlocks with the collection bowl section 148 an airtight connection made by an O ring 212. An O ring 214 also insures an air-tight connection between the top cap portion and the auxiliary evacuation section 116.

Now referring to FIGURES 12 and 13, it can be seen that the collection bowl section 148 and the discharge section 164 can be slidably interlocked in a plurality of positions. A locking tab 216 shown on a broken away section of the collection bowl section 148 may be fitted into any one of a plurality of grooves 217 formed in the collection discharge section 164. Further, a plurality of baffles 218 formed on the outer periphery of the collection bowl serve two functions. Firstly, the plurality of baffles 218 deaden the noise in the fluid pressure vapor being exhausted to the atmosphere through a muffler 219 shown broadly in FIGURE 7 and more particularly in FIGURE 1 as 14. Secondly, the plurality of baffles 218 are disposed so as to slidably engage with the inner periphery of the discharge section 164 and thus making for a tighter interlocking connection.

The plurality of hose or tube connections 118, 124, 178, and 201, are made through a plurality of suitable fittings 220, 221, 222, and 224, respectively. The evacuation assembly 142 is connected to a handle 225 which allows for the entire assembly to be easily manipulated into a number of various positions in relation to an oral cavity. The arm or handle 225 also allows the evacuation assembly 142 to be stored when not in use.

Now referring to a salient feature of this device over the embodiments shown in FIGURES 1 through 5, the additional evacuation assembly 144 has been added to provide a two hose section device. This device requires at least 50 p.s.i., and pulls approximately 5 inches Hg. The stacked arrangement of the housing shown in FIGURES 1 through 5 permit an additional evacuation assembly to be added with a minimum of difficulty. The auxiliary evacuation section 116 has been incorporated into the basic device intermediate to the top cap section 114 and the collection bowl section 148. Associated with this section is the venturi assembly 128 which discharges waste through the passage 130. Additionally, it can be seen that the additional venturi assembly 128 operates from the same source of fluid pressure which supplied the venturi assembly 132. This is accomplished in a compact manner by the addition of valve 110 and the manifold 108 to communicate with the hose 201. As shown in FIGURE 6, a slidable sleeve 226 on the evacuation assembly 144 may be hand manipulated by a patient in order to relieve the pressure from the top of the piston 191′ in the valve 110. Thus, it is appreciated that the evacuation assemblies 142 and 144 may be operated independently or simultaneously.

Although not a feature of this invention, it is to be noted that the slidable sleeve 226 has a plurality of holes 227 disposed in its outer periphery. In its present position the holes on the outer periphery connect with a passage formed in a molded head 228 to exhaust the pressure on the head of the piston 191′. When the sleeve is raised the holes in the head 226 are blocked from communicating with the hose 201. Since it is important that the fluid pressure supply entering the top cap portion 114 discharges well below the uppermost part of the collection bowl section 148, the venturi assembly 132 has been lengthened by an amount equal to the thickness of the added auxiliary evacuation section 116. In this manner, the fluid pressure discharge from the venturi orifice 134 in the embodiment of FIGURES 6 through 13, and the fluid pressure discharge from the orifice 11 in the embodiment of FIGURES 1 through 5, remains in the same relationship to the collection bowl.

The housing sections 114, 116, 148 and 164 are made of a light molded plastic, as well as the exhaust section 219 and the block 106. The block 106 may be easily mounted by a plurality of screws 230 and provides a T-shaped slot which is adaptable to receive the T-shaped fitting integrally formed with the exhaust section 219 as shown in FIGURE 7. Accordingly, the two hose evacuation assembly suction device is light, easily transportable, and easily mountable.

OPERATION OF FIGURES 6–14

The suction or aspirator device is operative to provide independent or simultaneous removal of waste material or foreign debris from the evacuation assemblies 142 and 144.

As to the evacuation assembly 142, the fluid pressure passing through mounting block 106, the manifold block 108, the valve 112, and into the top cap portion 114 at the passage 122 produces a vacuum in the collection bowl section 148 surrounding the venturi orifice 144. The suction created by the fluid pressure discharging at the venturi 134 withdraws waste from an oral cavity through the tube or hose 146 and into the collection bowl section 148. The waste material is then filtered at the strainer 160; the unfiltered waste descends through the passage 166 and into the discharge section housing 164. The remaining waste material may be discharged directly into an open reservoir at the line 170 or alternatively it may pass to a line 172 which is connected to an air circuit breaker (not shown) when the discharge is being made into a closed pressurized system. The evacuation assembly 142 functions in a manner quite similar to that shown in the FIGURES 1 through 5.

The evacuation assembly 144 is also effective to discharge waste material in a similar manner. However, in this instance the vacuum is produced at the head 140 in the following manner. Fluid pressure is directed through the manifold block 108 at the parallel passage 202, the valve 110, the passage 199', and into the venturi assembly 128. The vacuum produced at the venturi head 140 produces a suction in this area which removes or withdraws waste material from the hose 156 connected to the evacuation assembly 144. Waste material then progresses through the passage 130, the vertically disposed passage 158, and directly into the collection bowl section 148. The waste is ultimately discharged in a manner as previously described at the lines 170 or 172.

As to the specific operation of the evacuation assembly and associated control valves it can be seen that either the tube 178 or the tube 201 can be open to atmospheric pressure by the lever 176 or the slidable sleeve 226 respectively.

Taking the evacuation 144 in a non-activated state as illustrative, input pressure from the passage 202 travels through the hole 197', the passage 196', the arcuate slot 195', and into the area 193' to produce a force on the top of the plunger or piston 191'. This same fluid pressure is directly exerted on the bottom face of the piston 191'. However, due to the larger area of the top face of the piston, as contrasted to its bottom face, the pressure differential at the top of the plunger maintains it in a seated position. Thus, the ports 190' are closed to the passage 199', and no fluid pressure is allowed to reach the venturi assembly 128. On the other hand, when the sleeve 226 is in a raised position the tube 201 is open to atmospheric pressure. This allows the fluid pressure which has accumulated in the space 193' to bleed to the atmosphere through the passage 196'. Simultaneously the incoming fluid pressure through the passage 202 raises the piston 193 to an unseated position, and thus exposing the plurality of ports 190' to the passage 199'. The fluid pressure thus passes into the tube 124 and the venturi assembly 128. A vacuum is created in the area surrounding the head 140 which begins to withdraw the waste or foreign debris from the tube 156. Accordingly, it can be seen that the evacuation assembly may be simply activated by merely opening or closing the tube 201 to atmospheric pressure. The bleed hole 200 allows the piston member to be returned to its seated position in a smooth uninterrupted manner.

The valve 112 operates in an identical manner to that disclosed with regards to valve 110. When its respective plunger is in a seated position the line 199 is closed to fluid pressure and thus the venturi assembly 132 does not receive a source of fluid pressure. On the other hand, when line 196 is connected to atmospheric pressure through the passage 196 and tube 178, fluid pressure is delivered to the venturi assembly 132 to create a vacuum surrounding the venturi orifice 134.

This invention thus provides a highly efficient and compact suction device which may be adapted to a plurality of evacuation assemblies. Although only one auxiliary evacuation assembly has been shown in this invention, it is important to realize that additional auxiliary evacuation sections could be incorporated into the stacked housing arrangement. Further, the housing elements are composed of a synthetic material, such as high impact polystyrene, which has desirable non-corrosive properties.

While the invention has been described, it will be understood that it is capable of further modifications and this application is intended to cover any variations, uses, or adaptations of the invention following in general, the principles of the invention and including such departures form the present disclosure as come within known or customary practice in the art to which the invention pertains, and as may be applied to the essential features hereinbefore set forth and as fall within the scope of the invention or the limits of the appended claims.

Having thus described my invention, what I claim is:
1. A fluid operated suction device comprising:
 (a) a housing having a fluid pressure supply section,
 (b) a first waste intake section,
 (c) a second waste intake section,
 (d) a discharge section,
 (e) a venturi jet connected to said supply section and extending into said housing,
 (f) said venturi jet being responsive to fluid pressure for producing a first vacuum in said housing,
 (g) first hose evacuating means connected to said first waste intake means and responsive to said first vacuum for supplying waste to said discharge means,
 (h) a first control means for connecting said supply means to fluid pressure,
 (i) a second hose evacuating means connected to said second waste intake means for supplying waste to said discharge means, and
 (j) a second venturi jet connected to said second intake means and responsive to fluid pressure for producing a second vacuum,
 (k) a second control means for connecting fluid pressure to said second venturi jet.
2. The combination as set forth in claim 1 wherein:
 (a) said first hose evacuating means includes a first valve means operatively connected to said first control means,
 (b) said second hose evacuating means including a second valve means operatively connected to said second control means,
(c) whereby said first and second valve means are independently operative.

3. The combination as set forth in claim 2 including:
(a) a parallel pathed manifold block connecting said first and second control means to fluid pressure,
(b) said first valve means including a plunger operated member for communicating pressure to said first control means, and
(c) said second valve including a slidable sleeve member for communicating pressure to said second control means.

4. The combination as set forth in claim 3 wherein said first intake portion of said housing includes:
(a) a bowl means within said housing for collecting waste supplied by said first and second waste intake means, and
(b) an exhaust means within said housing for discharging fluid pressure vapor.

5. The combination as set forth in claim 4 and wherein:
(a) said housing sections are disposed in a stacked interlocking arrangement,
(b) said sections being composed of a lightweight molded material,
(c) said exhaust means including ducted ports for providing a passage between the interior and exterior of said housing,
(d) a means for supporting said housing associated with said ducted ports,
(e) a mounting block for receiving fluid pressure,
(f) said mounting block having said manifold block and said first and second control means mounted thereon, and adaptable for engagement with said means for supporting the housing.

6. A fluid operated suction device having a sectioned housing comprising:
(a) a top cap section having fluid pressure supply means,
(b) a waste collection bowl section having an intake,
(c) said collection bowl section being located below said top cap section,
(d) a venturi means for producing a vacuum within said collection bowl,
(e) said venturi means being connected to said cap section and extending into said collection bowl,
(f) said venturi means being centrally located within said housing,
(g) a discharge section adapted for slidable engagement with said collection bowl section,
(h) at least one other waste collecting section located intermediate to said cap section and to said collection bowl section,
(i) said at least one other waste collecting section having a separate vacuum producing means, and
(j) said sections being disposed in a stacked arrangement.

7. The combination as set forth in claim 6 wherein:
(a) said at least one other waste collecting section includes passage means for depositing waste into said collection bowl.

8. A gas powered suction device having
(a) a suction and a collection housing,
(b) a venturi comprised of entrance and exit means diametrically centered within said suction and collecting housing,
(c) a first valve connected at its open end directly to the source of gas power and on its closed end directly to the entrance means of said venturi and having a by-pass chamber,
(d) a manipulative hand nozzle having manual valve means connected directly to the by-pass chamber of said first valve,
(e) a conduit connecting said nozzle to said suction housing for conducting by suction fluid and solid matter collected at the end of said nozzle when said manual valve means is actuated,
(f) a straining screen insertable between the suction and collection housing to retain nonpassable particles, and
(g) an exit tube for the discharge of said fluid and solid matter resulting in the collection chamber.

9. A suction device substantially as described in claim 8 and having
(a) a two-part reversible detachable mounting means, one part being rigidly attached to the outer side of said collection housing and the second part inserted between the source of gas power and said first valve means,
(b) said rigidly attached one part also serving as a baffle for reduction of sound created by the operation of said venturi when said manual valve means is actuated.

10. A fluid operated suction device comprising:
(a) a housing having fluid pressure supply means, waste intake means, and waste discharge means,
(b) means within said housing for producing a first vacuum in response to fluid pressure,
(c) said first vacuum producing means being connected to said supply means,
(d) control means comprising first and second fluid pressure operated valve means,
(e) a manual actuating means,
(f) said first and said second valve means being interconnected and simultaneously actuated by said manual means to permit application of fluid pressure to said supply means, and
(g) first evacuating means connected to said waste intake means for supplying waste to said discharge means in response to a vacuum within said housing.

11. A fluid operated suction device comprising:
(a) a housing having fluid pressure supply means, waste intake means, and waste discharge means,
(b) means within said housing for producing a first vacuum in response to fluid pressure,
(c) said first vacuum producing means being connected to said supply means,
(d) first evacuating means connected to said waste intake means,
(e) control means responsive to said first means for connecting fluid pressure to said supply means,
(f) second evacuating means connected to said housing,
(g) whereby said first and second evacuating means supply waste to said discharge means.

12. The combination as set forth in claim 11 wherein said second evacuating means includes:
(a) means for producing a second vacuum in response to fluid pressure,
(b) valve means associated with said control means for connecting said second vacuum producing means to fluid pressure.

13. The combination as set forth in claim 12 wherein said control means includes:
(a) a first piston means for disconnecting fluid pressure from said first vacuum producing means, and
(b) a second piston means for disconnecting fluid pressure from said second vacuum producing means.

14. The combination as set forth in claim 13 wherein:
(a) said valve means is connected to said second piston means, and
(b) said valve is operative to intermittently connect fluid pressure to said second vacuum producing means.

15. A suction device housing
(a) a venturi jet extending into a suction and collection chamber and having as its source of power a supply of gaseous vapor under pressure,
(b) a suction tube connected at one end to the suction chamber and adapted at its other end for manipulating relative to a patient, (c) a first and second fluid pressure operated valve means, (d) a manual actuating means, (e) said first and said second valve means being interconnected and simultaneously actuated by said manual means to permit conveyance of gaseous vapor through the venturi jet reducing barometric pressure in the suction chamber thereby developing suction at the manipulative end of said suction tube, (f) an escape passage located in said collection chamber to discharge vapor, and (g) a drain at the base of said collection chamber for the discharge of fluids and solids.

16. The combination as recited in claim 15 wherein:
(a) said suction device further houses a retaining screen inserted in said suction chamber for at times collecting solid matter.

17. A suction device including:
(a) a housing defining a suction and collection chamber,
(b) a fluid discharge means opening into said chamber for introducing a fluid comprising a high velocity gas from a source of gaseous vapor under pressure,
(c) a suction tube connected at one end to said housing, and adapted at its other end for manipulating relative to a patient,
(d) first and second fluid pressure operated valve means,
(e) a manual actuating means,
(f) said first and said second valve means being interconnected and simultaneously actuated by said manual means to permit conveyance of gaseous vapor through the fluid discharge means to reduce barometric pressure in the suction and collection chamber, thereby developing suction at the manipulative end of said suction tube, (g) an escape passage located in said housing to discharge vapor therefrom, and (h) a drain at the base of said housing for the discharge of fluids and solids.

18. The combination as recited in claim 17 wherein:
(a) said housing comprises upper and lower, separable sections, and
(b) said fluid pressure discharge means and said one end of said suction tube are disposed in said upper housing section.

19. The combination as recited in claim 18 wherein:
(a) said escape passage and said drain are located in said lower housing section.

20. The combination as recited in claim 18 wherein:
(a) said one end of said suction tube is connected to means extending into said suction and collection chamber, and
(b) said suction device further includes a retaining screen situated in said lower housing section and centrally disposed above said drain.

References Cited

UNITED STATES PATENTS

| | | | |
|---|---|---|---|
| 962,901 | 6/1910 | Karpenstein | 128—277 |
| 988,345 | 4/1911 | Irgens | 128—277 |
| 2,191,717 | 2/1940 | Jeffery | 230—95 |
| 2,913,120 | 11/1959 | Glasby et al. | 230—95 |
| 3,017,886 | 1/1962 | Thompson | 128—276 |
| 3,164,153 | 1/1965 | Zorzi | 32—33 |

FOREIGN PATENTS

| | | |
|---|---|---|
| 1,148,709 | 5/1963 | Germany. |

CHARLES F. ROSENBAUM, Primary Examiner